US012581253B2

(12) United States Patent
Degen

(10) Patent No.: US 12,581,253 B2
(45) **Date of Patent: *Mar. 17, 2026**

(54) HEARING ASSISTANCE DEVICES WITH CONTROL OF OTHER DEVICES

(71) Applicant: Starkey Laboratories, Inc., Eden Prairie, MN (US)

(72) Inventor: Dustin Degen, Waconia, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/747,040

(22) Filed: Jun. 18, 2024

(65) Prior Publication Data

US 2025/0024212 A1 Jan. 16, 2025

Related U.S. Application Data

(63) Continuation of application No. 17/638,615, filed as application No. PCT/US2020/047967 on Aug. 26, 2020, now Pat. No. 12,035,110.

(Continued)

(51) Int. Cl.

*H04R 25/00* (2006.01)
*G08B 7/06* (2006.01)

(Continued)

(52) U.S. Cl.

CPC ............ *H04R 25/558* (2013.01); *G08B 7/06* (2013.01); *G08B 17/117* (2013.01);

(Continued)

(58) Field of Classification Search

CPC .. H04R 25/558; H04R 25/505; H04R 25/554; H04R 25/602; H04R 25/603;

(Continued)

(56) References Cited

U.S. PATENT DOCUMENTS

| | | | |
|---|---|---|---|
| 5,461,371 A | 10/1995 | Matsumoto et al. |
| 6,230,130 B1 | 5/2001 | Castello et al. |

(Continued)

FOREIGN PATENT DOCUMENTS

| | | |
|---|---|---|
| DE | 10030915 | 1/2002 |
| EP | 2725818 | 4/2014 |

(Continued)

OTHER PUBLICATIONS

"Communication Pursuant to Article 94(3) EPC," for European Patent Application No. 20768447.3 mailed Dec. 18, 2023 (11 pages).

(Continued)

*Primary Examiner* — Brian Ensey
(74) *Attorney, Agent, or Firm* — Pauly, DeVries Smith & Deffner LLC

(57) ABSTRACT

Embodiments herein relate to hearing assistance devices that can control other devices based on hearing assistance device events and/or status. In an embodiment, a hearing assistance system includes a hearing assistance device that can include a control circuit, a microphone in electrical communication with the control circuit, an electroacoustic transducer for generating sound in electrical communication with the control circuit, and a power supply circuit. The hearing assistance device can be configured to initiate sending a hearing accommodative command to a separate controllable device upon occurrence of a hearing assistance device event. The hearing assistance device event can be raised by detection of at least one of the hearing assistance device not being worn by the subject, the hearing assistance device in a not-in-use operating state, the hearing assistance device entering a recharging mode, and the hearing assistance device entering a shut-down sequence. Other embodiments are also included herein.

20 Claims, 9 Drawing Sheets

Related U.S. Application Data

(60) Provisional application No. 62/891,737, filed on Aug. 26, 2019.

(51) Int. Cl.

| | |
|---|---|
| ***G08B 17/117*** | (2006.01) |
| *G08B 3/10* | (2006.01) |
| *G08B 5/38* | (2006.01) |
| *G08B 6/00* | (2006.01) |

(52) U.S. Cl.

CPC ......... *H04R 25/505* (2013.01); *H04R 25/554* (2013.01); *H04R 25/602* (2013.01); *H04R 25/603* (2019.05); *H04R 25/604* (2013.01); *H04R 25/609* (2019.05); *G08B 3/10* (2013.01); *G08B 5/38* (2013.01); *G08B 6/00* (2013.01); *H04R 2225/31* (2013.01); *H04R 2225/51* (2013.01); *H04R 2225/55* (2013.01); *H04R 2225/61* (2013.01)

(58) Field of Classification Search

CPC ........................... H04R 25/604; H04R 25/609; H04R 2225/31; H04R 2225/51; H04R 2225/55; H04R 2225/61; H04R 25/305; H04R 25/552

See application file for complete search history.

(56) References Cited

U.S. PATENT DOCUMENTS

| | | | | |
|---|---|---|---|---|
| 6,498,955 | B1 | 12/2002 | McCarthy et al. | |
| 8,780,201 | B1 | 7/2014 | Scalisi et al. | |
| 8,923,543 | B2 | 12/2014 | Sacha et al. | |
| 9,055,202 | B1 | 6/2015 | Scalisi et al. | |
| 9,100,694 | B1 | 8/2015 | Chandel et al. | |
| 9,136,881 | B2 | 9/2015 | Groeschel et al. | |
| 9,167,356 | B2 | 10/2015 | Higgins et al. | |
| 9,179,107 | B1 | 11/2015 | Scalisi et al. | |
| 9,179,109 | B1 | 11/2015 | Kasmir et al. | |
| 9,210,518 | B2 | 12/2015 | Zhang | |
| 9,219,964 | B2 | 12/2015 | Merks | |
| 9,742,890 | B2 | 8/2017 | Gibbons | |
| 9,794,701 | B2 | 10/2017 | Flood et al. | |
| 9,848,273 | B1 | 12/2017 | Helwani et al. | |
| 9,940,928 | B2 | 4/2018 | Haubrich et al. | |
| 10,543,371 | B2 * | 1/2020 | Hunt | A61N 1/36036 |
| 10,600,291 | B2 | 3/2020 | Kashar | |
| 10,605,470 | B1 | 3/2020 | Saxena et al. | |
| 10,743,115 | B2 * | 8/2020 | Frederiksen | H04R 25/305 |
| 10,827,249 | B1 | 11/2020 | Pine et al. | |
| 11,304,013 | B2 | 4/2022 | Burwinkel et al. | |
| 11,812,213 | B2 | 11/2023 | Bhowmik et al. | |
| 11,825,272 | B2 | 11/2023 | Burwinkel et al. | |
| 12,035,110 | B2 | 7/2024 | Degen | |
| 2005/0172006 | A1 | 8/2005 | Hsiang | |
| 2005/0231356 | A1 | 10/2005 | Bish et al. | |
| 2006/0023900 | A1 | 2/2006 | Erhart et al. | |
| 2008/0140868 | A1 | 6/2008 | Kalayjian et al. | |
| 2008/0181435 | A1 | 7/2008 | Ozaki et al. | |
| 2009/0031336 | A1 | 1/2009 | Chavez et al. | |
| 2009/0076816 | A1 | 3/2009 | Bradford et al. | |
| 2012/0060176 | A1 | 3/2012 | Chai et al. | |
| 2012/0102409 | A1 | 4/2012 | Fan et al. | |
| 2014/0223461 | A1 | 8/2014 | Hatambeiki et al. | |
| 2015/0105029 | A1 | 4/2015 | Russell et al. | |
| 2017/0318145 | A1 | 11/2017 | Gibbons | |
| 2017/0332183 | A1 | 11/2017 | Shennib | |
| 2018/0081619 | A1 | 3/2018 | Peters et al. | |
| 2018/0204576 | A1 | 7/2018 | Dhoot et al. | |
| 2018/0317837 | A1 | 11/2018 | Burwinkel et al. | |
| 2018/0343527 | A1 | 11/2018 | Edwards | |
| 2019/0082307 | A1 | 3/2019 | Miller et al. | |
| 2019/0246216 | A1 | 8/2019 | Frederiksen et al. | |
| 2019/0278555 | A1 | 9/2019 | Carvajal et al. | |
| 2019/0281389 | A1 | 9/2019 | Gordon et al. | |
| 2020/0069281 | A1 | 3/2020 | Chan et al. | |
| 2020/0086133 | A1 | 3/2020 | Wang et al. | |
| 2020/0260199 | A1 | 8/2020 | Burwinkel et al. | |
| 2020/0288251 | A1 | 9/2020 | Kuipers | |
| 2022/0103927 | A1 | 3/2022 | Bhowmik et al. | |
| 2022/0286792 | A1 | 9/2022 | Burwinkel et al. | |
| 2022/0337962 | A1 | 10/2022 | Degen | |
| 2023/0020019 | A1 | 1/2023 | Bhowmik et al. | |

FOREIGN PATENT DOCUMENTS

| | | |
|---|---|---|
| EP | 3176782 | 6/2017 |
| WO | 2017120065 | 7/2017 |
| WO | 2020163722 | 8/2020 |
| WO | 2020236911 | 11/2020 |
| WO | 2021041522 | 3/2021 |
| WO | 2021127226 | 6/2021 |

OTHER PUBLICATIONS

"Communication pursuant to Article 94(3) EPC," for European Patent Application No. 20842440.8 mailed Mar. 27, 2024 (15 pages).

"Eye Tracking & Access Technologies," PRC-Saltillo Product Overview page accessible at least as early as Dec. 9, 2019 at URL <https://www.prentrom.com/prc_advantage/eye-tracking-and-access-technologies> (11 pages).

"How NFL Equipment Works," HowStuffWorks article that mentions wireless communication in NFL helmets has been used since 1994. Accessible at URL <https://entertainment.howstuffworks.com/fb-equip5.htm> at least as early as Apr. 9, 2003 (28 pages).

"International Preliminary Report on Patentability," for PCT Application No. PCT/US2020/017222 mailed Aug. 19, 2021 (14 pages).

"International Preliminary Report on Patentability," for PCT Application No. PCT/US2020/065682 mailed Jun. 30, 2022 (11 pages).

"International Preliminary Report on Patentability," for PCT/US2020/047967 mailed Mar. 10, 2022 (9 pages).

"International Search Report and Written Opinion," for PCT Application No. PCT/US2020/017222 mailed Jul. 6, 2020 (21 pages).

"International Search Report and Written Opinion," for PCT Application No. PCT/US2020/047967 mailed Oct. 22, 2020 (13 pages).

"International Search Report and Written Opinion," for PCT Application No. PCT/US2020/065682 mailed Mar. 16, 2021 (15 pages).

"Invitation to Pay Additional Fees," for PCT Application No. PCT/US2020/017222 mailed May 13, 2020 (17 pages).

"Non-Final Office Action," for U.S. Appl. No. 16/784,947 mailed Jul. 23, 2021 (17 pages).

"Non-Final Office Action," for U.S. Appl. No. 17/489,041 mailed Jan. 10, 2023 (15 pages).

"Non-Final Office Action," for U.S. Appl. No. 17/638,615 mailed Dec. 1, 2023 (17 pages).

"Non-Final Office Action," for U.S. Appl. No. 17/700,926 mailed Jan. 17, 2023 (17 pages).

"Non-Final Office Action," for U.S. Appl. No. 17/786,675 mailed Mar. 28, 2024 (17 pages).

"Non-Final Office Action," for U.S. Appl. No. 18/512,651 mailed Jun. 3, 2024 (8 pages).

"Notice of Allowance," for U.S. Appl. No. 16/784,947 mailed Dec. 9, 2021 (10 pages).

"Notice of Allowance," for U.S. Appl. No. 17/489,041 mailed Jul. 5, 2023 (15 pages).

"Notice of Allowance," for U.S. Appl. No. 17/638,615 mailed Feb. 28, 2024 (15 pages).

"Notice of Allowance," for U.S. Appl. No. 17/700,926 mailed Jul. 13, 2023 (15 pages).

"Response to Non-Final Office Action," for U.S. Appl. No. 16/784,947 mailed Sep. 20, 2021 (9 pages).

"Response to Non-Final Office Action," for U.S. Appl. No. 17/489,041 filed Apr. 10, 2023 (9 pages).

"Response to Non-Final Office Action," for U.S. Appl. No. 17/700,926 filed Apr. 11, 2023 (8 pages).

(56) References Cited

OTHER PUBLICATIONS

"Response to Non-Final Rejection," mailed on Dec. 1, 2023, for U.S. Appl. No. 17/638,615, submitted via EFS-Web on Feb. 16, 2024, 9 pages.
Allan, Patrick "Build some DIY, Smart Switching Baby Monitor Headphones," Synopsis of Ben Heck Show episode. Published Jan. 4, 17 and accessible at URL <https://lifehacker.com/build-some-diy-smart-switching-baby-monitor-headphones-1790775604> (4 pages).
Martins Pereira, Cesar Augusto, et al."Development and Evaluation of a Head-Controlled Human-Computer Interface with Mouse-Like Functions for Physically Disabled Users," Clinics 2009; 64(10): 975-81 (8 pages).
Zhang, Ben, et al. "HOBS: Head Orientation-Based Selection in Physical Spaces," SUI 2014, Oct. 4-5, Honolulu, HI, USA.
"Communication pursuant to Article 94(3)," for European Patent Application No. 20768447.3 mailed May 28, 2025 (6 pages).

* cited by examiner

HEARING ASSISTANCE DEVICES WITH CONTROL OF OTHER DEVICES

This application is a continuation of U.S. application Ser. No. 17/638,615, filed Feb. 25, 2022, which is a 35 U.S.C. § 371 national phase application of PCT Application No. PCT/US2020/047967, filed Aug. 26, 2020, which claims the benefit to U.S. Provisional Application No. 62/891,737, filed Aug. 26, 2019, the contents of which are herein incorporated by reference in its entirety.

FIELD

Embodiments herein relate to hearing assistance devices and hearing assistance device systems. More specifically, embodiments herein relate to hearing assistance devices and hearing assistance device systems that can control other devices based on hearing assistance device events and/or status.

BACKGROUND

There are many devices in a given home/work/recreational environment that generate sound as a part of their intended functionality. By way of example, a television generates sound so that people can hear the audio content along with the video content. A doorbell generates sound in order to alert an occupant to the presence of someone at the door. A smoke detector or a carbon monoxide detector generates sound in order to alert an occupant to the presence of a possibly dangerous condition. It will be appreciated that these are just a few examples of device generating sound as a part of their intended functionality.

For those with degraded hearing, interacting with devices that generate sounds can be more difficult. For example, in the context of a television, an individual with degraded hearing may not understand all of the words in the audio content or may have to turn up the volume so loud that it bothers other people who may be in the environment. In the context of a safety device, such as a smoke or carbon monoxide detector, the individual may not perceive an alarm.

Hearing assistance devices have proven to greatly increase the quality of life of those with degraded hearing. When properly configured, hearing assistance devices can allow for most people to interact with devices that generate sound in a manner so as to fully realize the benefits of their functionality.

SUMMARY

Embodiments herein relate to hearing assistance devices and hearing assistance device systems that can control other devices based on hearing assistance device events and/or status. In a first aspect, a hearing assistance system is included having a hearing assistance device that can include a control circuit, a microphone in electrical communication with the control circuit, an electroacoustic transducer for generating sound in electrical communication with the control circuit, and a power supply circuit in electrical communication with the control circuit. The hearing assistance system can be configured to initiate sending a hearing accommodative command to a separate controllable device upon occurrence of a hearing assistance device event. The hearing assistance device event can be raised by detection of at least one of the hearing assistance device not being worn by the subject, the hearing assistance device in a not-in-use operating state, the hearing assistance device entering a recharging mode, and the hearing assistance device entering a shut-down sequence.

In a second aspect, in addition to one or more of the preceding or following aspects, or in the alternative to some aspects, the hearing accommodative command includes at least one of a sound mode change and an alert mode change.

In a third aspect, in addition to one or more of the preceding or following aspects, or in the alternative to some aspects, the hearing assistance device can further include at least one of electrical contacts or a wireless power receiving antenna.

In a fourth aspect, in addition to one or more of the preceding or following aspects, or in the alternative to some aspects, a system herein can further include an accessory device configured to physically interface with the hearing assistance device when it is not being worn by a subject, wherein the hearing assistance device event can also be raised by detection of the hearing assistance device physically interfacing with the accessory device.

In a fifth aspect, in addition to one or more of the preceding or following aspects, or in the alternative to some aspects, detection of the hearing assistance device not being worn by the subject can be determined based on a crossing of a threshold physical proximity of the hearing assistance device to the accessory device.

In a sixth aspect, in addition to one or more of the preceding or following aspects, or in the alternative to some aspects, an accessory device can include a charging case.

In a seventh aspect, in addition to one or more of the preceding or following aspects, or in the alternative to some aspects, a hearing accommodative command can be sent from the hearing assistance device, the accessory device, or another device, or a combination thereof.

In an eighth aspect, in addition to one or more of the preceding or following aspects, or in the alternative to some aspects, the hearing assistance device further can include a temperature sensor, wherein detection of the hearing assistance device not being worn by the subject is determined based on a change in temperature detected by the temperature sensor.

In a ninth aspect, in addition to one or more of the preceding or following aspects, or in the alternative to some aspects, the sound mode change causes the volume setting on the controllable device to be increased or decreased.

In a tenth aspect, in addition to one or more of the preceding or following aspects, or in the alternative to some aspects, the sound mode change causes sound on the controllable device to be increased or decreased in frequency.

In an eleventh aspect, in addition to one or more of the preceding or following aspects, or in the alternative to some aspects, the sound mode change causes the pattern of sound on the controllable device to be changed.

In a twelfth aspect, in addition to one or more of the preceding or following aspects, or in the alternative to some aspects, the alert mode change causes an alarm sensitivity of the separate controllable device to increase or decrease.

In a thirteenth aspect, in addition to one or more of the preceding or following aspects, or in the alternative to some aspects, the alert mode change causes a light associated with the separate controllable device to vary in at least one of color and intensity.

In a fourteenth aspect, in addition to one or more of the preceding or following aspects, or in the alternative to some aspects, the alert mode change causes a light associated with the separate controllable device to flash on and off.

In a fifteenth aspect, in addition to one or more of the preceding or following aspects, or in the alternative to some aspects, the alert mode change causes an accessory device to monitor ambient sound for a trigger sound and initiate an alert signal when a trigger sound has been detected.

In a sixteenth aspect, in addition to one or more of the preceding or following aspects, or in the alternative to some aspects, the trigger sound can include an audible alarm.

In a seventeenth aspect, in addition to one or more of the preceding or following aspects, or in the alternative to some aspects, the alert signal can include a visual alert.

In an eighteenth aspect, in addition to one or more of the preceding or following aspects, or in the alternative to some aspects, the alert signal can include a haptic alert.

In a nineteenth aspect, in addition to one or more of the preceding or following aspects, or in the alternative to some aspects, the hearing accommodative command can be relayed to the separate controllable device through a personal communications device paired to the hearing assistance device.

In a twentieth aspect, in addition to one or more of the preceding or following aspects, or in the alternative to some aspects, wherein the hearing accommodative command can be sent wirelessly.

In a twenty-first aspect, in addition to one or more of the preceding or following aspects, or in the alternative to some aspects, the separate controllable device selected from the group consisting of a TV, a radio, a doorbell, a smoke alarm, an oven, a stove, a phone, a wireless speaker, a carbon monoxide detector, a refrigerator, and a security system.

In a twenty-second aspect, in addition to one or more of the preceding or following aspects, or in the alternative to some aspects, the hearing assistance device is configured to send a second hearing accommodative command to the separate controllable device upon occurrence of a second hearing assistance device event. The second hearing assistance device event can be raised by detection of at least one of the hearing assistance device being worn by the subject, the hearing assistance device in an in-use operating state, the hearing assistance device exiting a recharging mode, and the hearing assistance device entering a startup sequence.

In a twenty-third aspect, a method of operating a hearing assistance device is included, the method detecting at least one of the hearing assistance device not being worn by the subject, the hearing assistance device in a not-in-use operating state, the hearing assistance device entering a recharging mode, and the hearing assistance device entering a shut-down sequence, and then initiating sending a hearing accommodative command to a separate controllable device upon such detection.

In a twenty-fourth aspect, in addition to one or more of the preceding or following aspects, or in the alternative to some aspects, the hearing accommodative command can include at least one of a sound mode change and an alert mode change.

In a twenty-fifth aspect, in addition to one or more of the preceding or following aspects, or in the alternative to some aspects, the hearing assistance device event can be also raised by detection of the hearing assistance device physically interfacing with an accessory device.

In a twenty-sixth aspect, in addition to one or more of the preceding or following aspects, or in the alternative to some aspects, detecting the hearing assistance device not being worn by the subject can be determined based on a crossing of a threshold physical proximity of the hearing assistance device to the accessory device.

In a twenty-seventh aspect, in addition to one or more of the preceding or following aspects, or in the alternative to some aspects, wherein the hearing accommodative command can be sent from an accessory device.

In a twenty-eighth aspect, in addition to one or more of the preceding or following aspects, or in the alternative to some aspects, the sound mode change can cause the volume setting on the controllable device to be increased or decreased.

In a twenty-ninth aspect, in addition to one or more of the preceding or following aspects, or in the alternative to some aspects, the sound mode change can cause sound on the controllable device to be increased or decreased in frequency.

In a thirtieth aspect, in addition to one or more of the preceding or following aspects, or in the alternative to some aspects, the sound mode change can cause the pattern of sound on the controllable device to be changed.

In a thirty-first aspect, in addition to one or more of the preceding or following aspects, or in the alternative to some aspects, the alert mode change can cause an alarm sensitivity of the separate controllable device to increase or decrease.

In a thirty-second aspect, in addition to one or more of the preceding or following aspects, or in the alternative to some aspects, the alert mode change can cause a light associated with the separate controllable device to vary in at least one of color and intensity.

In a thirty-third aspect, in addition to one or more of the preceding or following aspects, or in the alternative to some aspects, the alert mode change can cause a light associated with the separate controllable device to flash on and off.

In a thirty-fourth aspect, a hearing assistance system is included having a hearing assistance device accessory. The accessory can include a control circuit and a power supply circuit in electrical communication with the control circuit. The hearing assistance device accessory can be configured to initiate sending a hearing accommodative command to a separate controllable device upon occurrence of a hearing assistance device event. The hearing assistance device event can be raised by detection of at least one of a hearing assistance device not being worn by the subject, the hearing assistance device in a not-in-use operating state, the hearing assistance device entering a recharging mode, and the hearing assistance device entering a shut-down sequence.

In a thirty-fifth aspect, in addition to one or more of the preceding or following aspects, or in the alternative to some aspects, the hearing accommodative command includes at least one of a sound mode change and an alert mode change.

In a thirty-sixth aspect, in addition to one or more of the preceding or following aspects, or in the alternative to some aspects, the hearing assistance device further can include at least one of electrical contacts or a wireless power transmitting antenna.

In a thirty-seventh aspect, in addition to one or more of the preceding or following aspects, or in the alternative to some aspects, the accessory device can be configured to physically interface with the hearing assistance device when it is not being worn by a subject; wherein the hearing assistance device event can also be raised by detection of the hearing assistance device physically interfacing with the accessory device.

In a thirty-eighth aspect, in addition to one or more of the preceding or following aspects, or in the alternative to some aspects, detection of the hearing assistance device not being worn by the subject can be determined based on a crossing of a threshold physical proximity of the hearing assistance device to the accessory device.

In a thirty-ninth aspect, in addition to one or more of the preceding or following aspects, or in the alternative to some aspects, the accessory device can include a charging case.

In a fortieth aspect, in addition to one or more of the preceding or following aspects, or in the alternative to some aspects, wherein the hearing accommodative command is sent from the accessory device.

In a forty-first aspect, in addition to one or more of the preceding or following aspects, or in the alternative to some aspects, wherein the hearing assistance device accessory detects at least one of a hearing assistance device not being worn by the subject, the hearing assistance device in a not-in-use operating state, the hearing assistance device entering a recharging mode, and the hearing assistance device entering a shut-down sequence In a forty-second aspect, in addition to one or more of the preceding or following aspects, or in the alternative to some aspects, wherein the sound mode change causes the volume setting on the controllable device to be increased or decreased.

In a forty-third aspect, in addition to one or more of the preceding or following aspects, or in the alternative to some aspects, wherein the sound mode change causes sound on the controllable device to be increased or decreased in frequency.

In a forty-fourth aspect, in addition to one or more of the preceding or following aspects, or in the alternative to some aspects, wherein the sound mode change causes the pattern of sound on the controllable device to be changed.

In a forty-fifth aspect, in addition to one or more of the preceding or following aspects, or in the alternative to some aspects, wherein the alert mode change causes an alarm sensitivity of the separate controllable device to increase or decrease.

In a forty-sixth aspect, in addition to one or more of the preceding or following aspects, or in the alternative to some aspects, wherein the alert mode change causes a light associated with the separate controllable device to vary in at least one of color and intensity.

In a forty-seventh aspect, in addition to one or more of the preceding or following aspects, or in the alternative to some aspects, wherein the alert mode change causes a light associated with the separate controllable device to flash on and off.

In a forty-eighth aspect, in addition to one or more of the preceding or following aspects, or in the alternative to some aspects, wherein the alert mode change causes an accessory device to monitor ambient sound for a trigger sound and initiate an alert signal when a trigger sound has been detected.

In a forty-ninth aspect, in addition to one or more of the preceding or following aspects, or in the alternative to some aspects, the trigger sound can include an audible alarm.

In a fiftieth aspect, in addition to one or more of the preceding or following aspects, or in the alternative to some aspects, the alert signal can include a visual alert.

In a fifty-first aspect, in addition to one or more of the preceding or following aspects, or in the alternative to some aspects, the alert signal can include a haptic alert.

In a fifty-second aspect, in addition to one or more of the preceding or following aspects, or in the alternative to some aspects, wherein the hearing accommodative command is relayed to the separate controllable device through a personal communications device paired to the hearing assistance device.

In a fifty-third aspect, in addition to one or more of the preceding or following aspects, or in the alternative to some aspects, wherein the hearing accommodative command is sent wirelessly.

In a fifty-fourth aspect, in addition to one or more of the preceding or following aspects, or in the alternative to some aspects, the separate controllable device can be selected from the group consisting of a TV, a radio, a doorbell, a smoke alarm, an oven, a stove, a phone, a wireless speaker, a carbon monoxide detector, a refrigerator, and a security system.

In a fifty-fifth aspect, in addition to one or more of the preceding or following aspects, or in the alternative to some aspects, the hearing assistance device accessory can be configured to send a second hearing accommodative command to the separate controllable device upon occurrence of a second hearing assistance device event, and wherein the second hearing assistance device event is raised by detection of at least one of the hearing assistance device being worn by the subject, the hearing assistance device in an in-use operating state, the hearing assistance device exiting a recharging mode, and the hearing assistance device entering a startup sequence.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures (FIGS.), in which.

Figure 1:
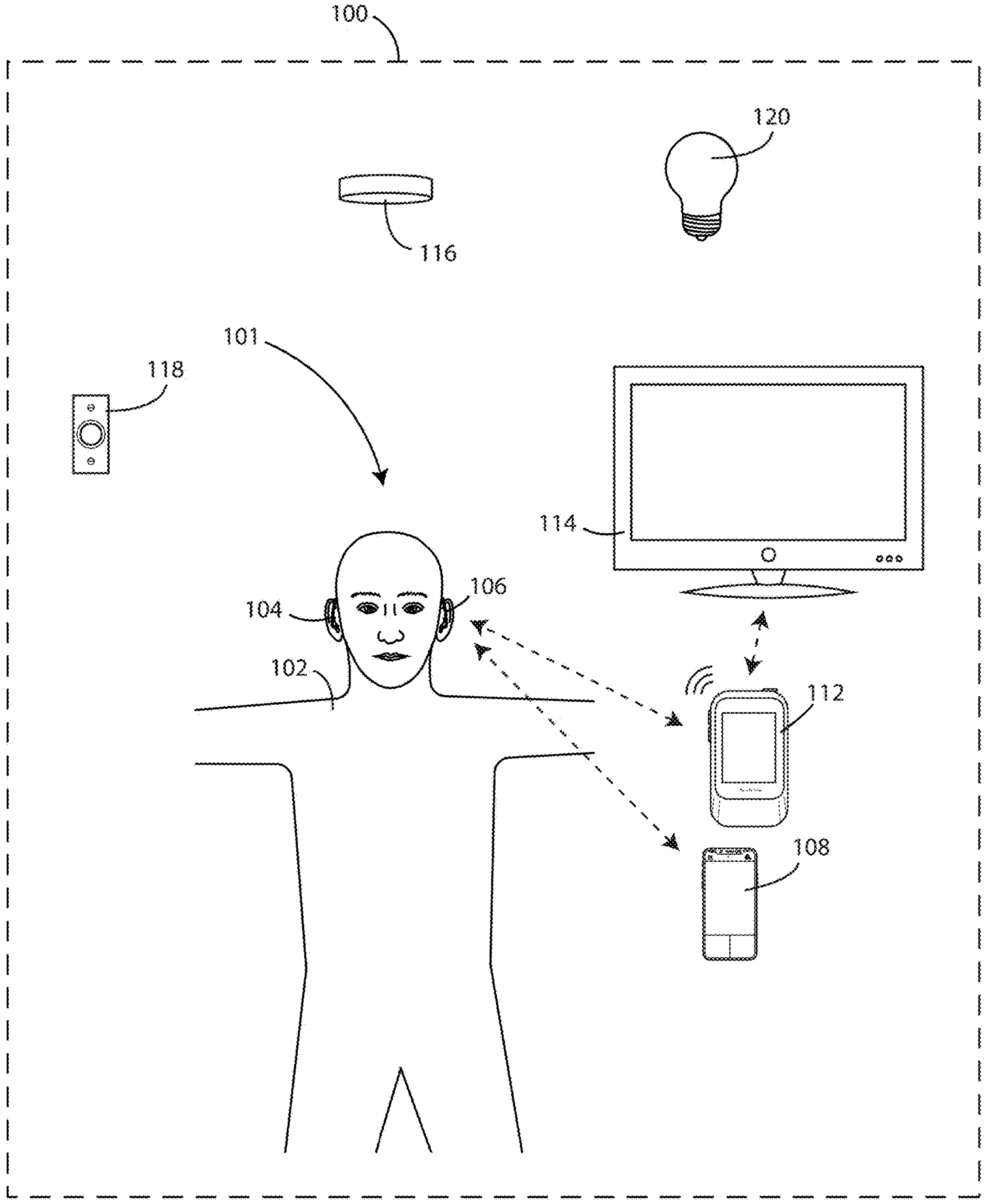
FIG. 1 is a schematic view of an environment in accordance with various embodiments herein.

While embodiments are susceptible to various modifications and alternative forms, specifics thereof have been shown by way of example and drawings, and will be described in detail. It should be understood, however, that the scope herein is not limited to the particular aspects described. On the contrary, the intention is to cover modifications, equivalents, and alternatives falling within the spirit and scope herein.

DETAILED DESCRIPTION

In some scenarios, operational parameters of devices within an individual's environment may be changed in order to account for their hearing status. For example, volume settings on devices may be increased so that they generate sound at a higher volume. In some cases, warnings or alerts may even be provided through means other than audio, such as by providing warnings or alerts visually or even haptically.

However, as referenced above, hearing assistance devices have proven to greatly increase the quality of life of those with degraded hearing. Because hearing assistance devices are so effective, it may not be necessary to change operational parameters of devices in a home/work/recreational environment. For example, normally a person with degraded hearing may turn up the volume of their television to help attenuate the effects of their poor hearing. However, if they have properly fitted hearing assistance devices, this may not be necessary. This is similarly true with other controllable devices that may include audio outputs in the subject's environment.

Unfortunately, hearing assistance devices may not always be used and/or in an operational state. For example, a subject may take them out periodically. A subject may leave them behind in one location before going to another. As another example, many subjects remove hearing assistance devices before they go to sleep at night. In addition, the hearing assistance device may not always be in an operational state. For example, batteries may need to be charged or replaced. The hearing assistance device may be shut down. There are many possible reasons why hearing assistance devices may not currently be in active use by the subject.

Because changes in the active use of hearing assistance devices by a hearing assistance subject may occur somewhat unpredictably and multiple times within a day, it can be challenging to set operational parameters of devices within their environment appropriately.

However, embodiments herein can assist with setting operation parameters of devices in a subject's environment appropriately. In an embodiment, a hearing assistance system is included having a hearing assistance device. The hearing assistance device can include a control circuit, a microphone in electrical communication with the control circuit, an electroacoustic transducer for generating sound in electrical communication with the control circuit, and a power supply circuit in electrical communication with the control circuit. The hearing assistance device is configured to initiate sending a hearing accommodative command to a separate controllable device upon occurrence of a hearing assistance device event. The hearing assistance device event can be raised by detection of at least one of the hearing assistance device not being worn by the subject, the hearing assistance device in a not-in-use operating state, the hearing assistance device entering a recharging mode, and the hearing assistance device entering a shut-down sequence. Further details, other embodiments, and variations are described in greater detail below.

Referring now to FIG. 1, a schematic view of an environment 100 is shown in accordance with various embodiments herein. FIG. 1 also shows components of a hearing assistance system 101 and a hearing assistance subject 102 within the environment 100. The hearing assistance system 101 can include a hearing assistance device 104. The hearing assistance system 101 can also include a second hearing assistance device 106. Further, the hearing assistance system 101 can include a personal communications device 108.

In various embodiments, the hearing assistance device 104 can be configured to initiate sending a hearing accommodative command to a separate controllable device upon occurrence of a hearing assistance device 104 event. In various embodiments, the hearing assistance device 104 event is raised by detection of an occurrence of a condition. Such conditions can include, but are not limited to, the hearing assistance device 104 not being worn by the subject, the hearing assistance device 104 can be in a not-in-use operating state, the hearing assistance device 104 entering a recharging mode, the hearing assistance device 104 entering a shut-down sequence, detection of the hearing assistance device 104 physically interfacing with an accessory device, etc.

In various embodiments, the hearing assistance device 104 can be configured to send a second hearing accommodative command to the separate controllable device upon occurrence of a second hearing assistance device event. In various embodiments, the second hearing assistance device event can be raised by the detection of an occurrence of a condition. Such conditions can include, but are not limited to, the hearing assistance device 104 being in an in-use operating state, the hearing assistance device 104 exiting a recharging mode, the hearing assistance device 104 entering a startup sequence, or the like.

The hearing accommodative command can be sent to a device (such as a controllable device) within the environment 100 in order to change operational parameters thereof. In this example, controllable devices within the environment 100 can include a streamer device 112, a TV 114, a smoke alarm 116, a doorbell 118, a light 120, etc. Other examples of illustrative controllable devices are provided below.

The hearing accommodative commands can act on one device or can act on multiple devices in a cooperative or non-cooperative manner. By way of example, a command can be sent directly to a doorbell device to turn its sound volume up or down. This type of command acts on one device. As another example, a general sound change command can be sent out and any device that receives it can respond by changing its sound volume. As another example, a command can be sent regarding a doorbell accommodation and when the doorbell receives the command it increases the doorbell volume but it also gets put in an operational mode where pressing the doorbell no longer just results in an audible chime but also results in a command being sent to lights within the environment to flash on and off.

Thus, in various embodiments, the operational parameters of the light 120 can be changed such that the light produced thereby can vary in at least one of color (frequency spectra) and intensity. In various embodiments, the light 120 can be controlled to flash on and off.

In some embodiments, the detection of the hearing assistance device physically interfacing with an accessory device can be used to raise an event herein.

Figure 2:
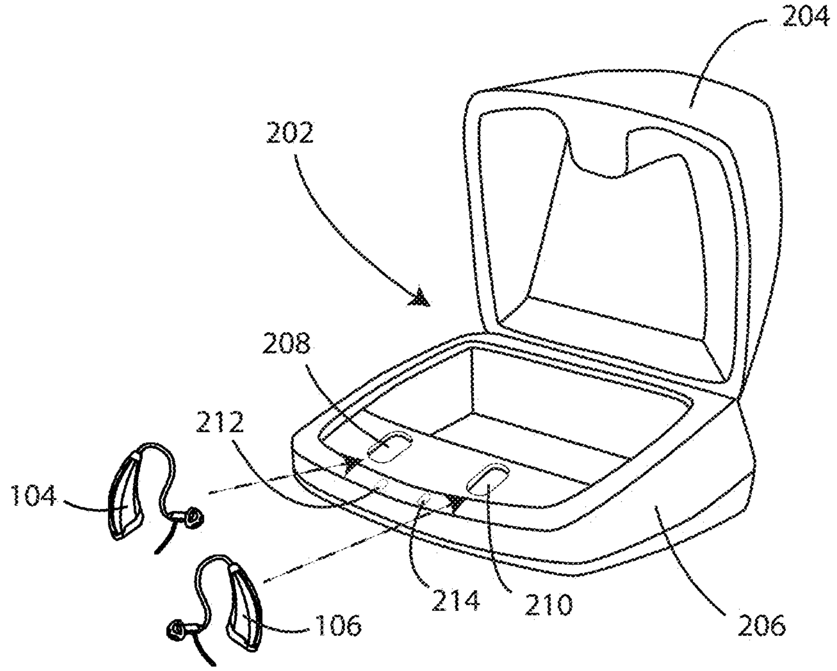
FIG. 2 is a schematic view of a charging case in accordance with various embodiments herein.

Referring now to FIG. 2, a schematic view of a charging case 202 is shown in accordance with various embodiments herein. The charging case 202 can be a part of the hearing assistance system. The charging case 202 can include a clamshell lid 204. The charging case 202 can also include a base 206. The charging case 202 can include a first charging pad 208 and a second charging pad 210. The charging case 202 also includes a first status light 212 and a second status light 214.

In various embodiments, the system can include an accessory device configured to physically interface with the hearing assistance device 104 when it is not being worn by a subject, wherein the hearing assistance device 104 event can also be raised by detection of the hearing assistance device 104 physically interfacing with the accessory device. An example of an accessory device is a charging case 202.

The hearing assistance devices 104, 106 can be recharged by placing them within the charging case 202 and receiving power wirelessly (such as using inductive recharging techniques) and/or through direct wired contacts. The system can deduce that if the hearing assistance devices 104, 106 are in very close physical proximity of the charging case 202 and/or in the process of being charged by the charging case 202, then they are not available for use and hearing accommodative commands should be sent consistent with the subject not currently receiving the hearing acuity benefits normally provided by the hearing assistance devices 104, 106. Specifically, the hearing assistance devices can detect if they are in very close physical proximity of the charging case 202 and/or in the process of being charged by the charging case 202 (such as by receiving power from the charging case 202), the charging case 202 itself can detect if the hearing assistance devices are in very close physical proximity to the charging case 202 and/or in the process of being charged by the charging case 202, or both the hearing assistance devices and the charging case can detect such an occurrence.

If it is the hearing assistance devices 104, 106 that detect the occurrence, then one or two of them can send one or more hearing accommodative commands to a separate controllable device. If it is the charging case 202 (or another accessory device) that detects the occurrence then it can send one or more hearing accommodative commands to a separate controllable device. Otherwise, in various embodiments, both the hearing assistance devices 104, 106 and the charging case 202 can send one or more hearing accommodative commands to controllable devices.

There are many different ways of detecting when hearing assistance devices are not being worn by a subject. For example, in various embodiments, wherein detection of the hearing assistance device not being worn by the subject is determined based on a crossing of a threshold physical proximity of the hearing assistance device 104 to the accessory device. As another example, in various embodiments, the hearing assistance device 104 further can include a temperature sensor, wherein detection of the hearing assistance device not being worn by the subject is determined based on a change in temperature detected by the temperature sensor. For example, if temperature is sensed to drop below normal temperatures for the ear canal (such as below about 35° C.) and remains below that level for a threshold amount of time (such as 1, 2, 5, 10, 15, 20 or 30 minutes), then the system can conclude that the subject is not currently wearing the hearing assistance devices. As another example, subjects will typically exhibit a degree of movement that can be sensed even when they are still. This degree of movement varies from the reduced amount of movement associate with the hearing assistance devices sitting on a counter, cabinet, night stand, and the like. As such, in some embodiments, if movement sensors associated with the hearing assistance devices sense movement falling below a threshold value, then the system can conclude that the subject is not currently wearing the hearing assistance devices.

Figure 3:
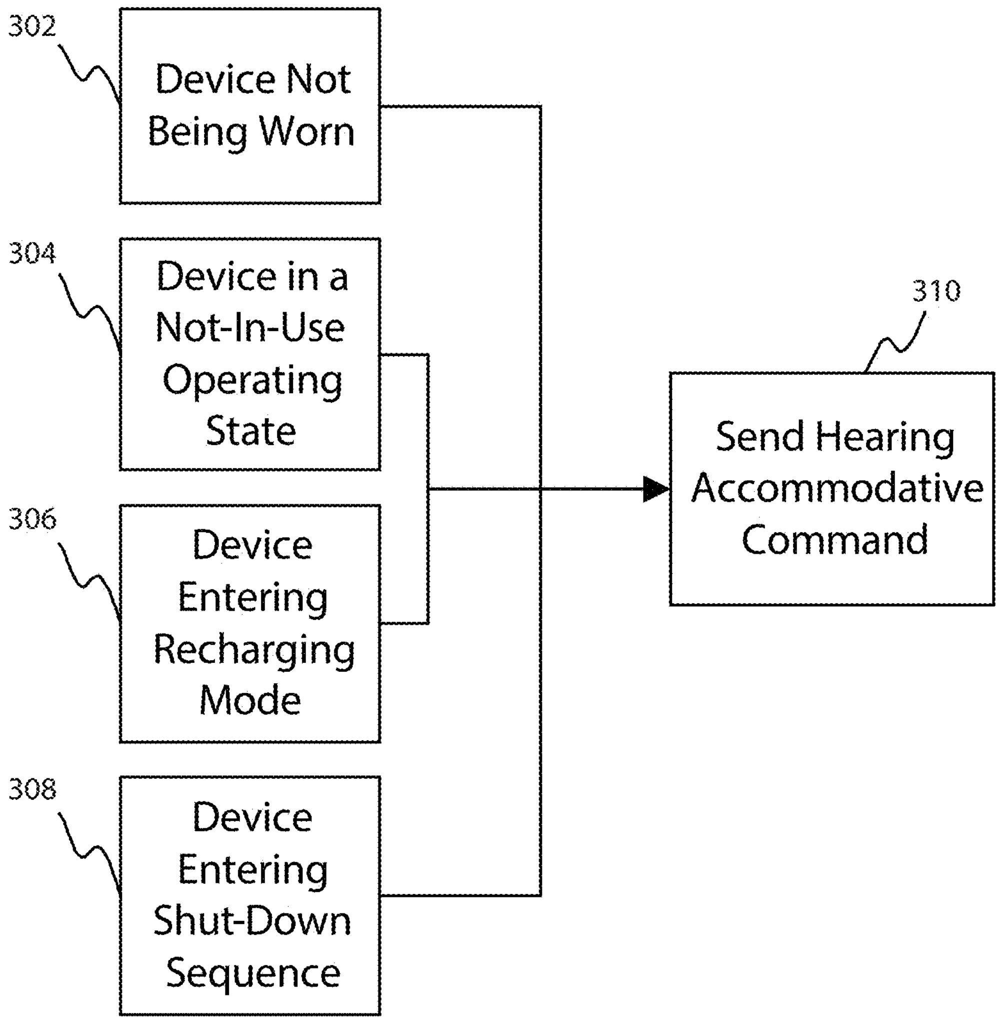
FIG. 3 is a flow chart of operations in accordance with various embodiments herein.

Referring now to FIG. 3, a flow chart of operations is shown in accordance with various embodiments herein. Embodiments can include operations of detecting the hearing assistance device not being worn by the subject 302, detecting that the hearing assistance device is in a not-in-use operating state 304, detecting that the hearing assistance device entering a recharging mode 306, detecting that the hearing assistance device entering a shut-down sequence 308.

After such detections, embodiments herein can include executing an operation of initiating sending 310 a hearing accommodative command to a separate controllable device upon such detection. Further details of exemplary hearing accommodative commands are described in greater detail below.

Various embodiments herein can include the use of a personal communications device. In some embodiments, a personal communications device can qualify as a type of accessory device. Accessory devices herein can be in communication with the ear-worn device(s). The accessory devices can be useful for various aspects including, but not limited to, as a bridge or gateway to a data network, as a processing resource that may have more processing power than that associated with the ear-worn device, a means for displaying visual information to the device wearer, as a means for receiving user input, as a means for relaying commands, etc.

Figure 4:
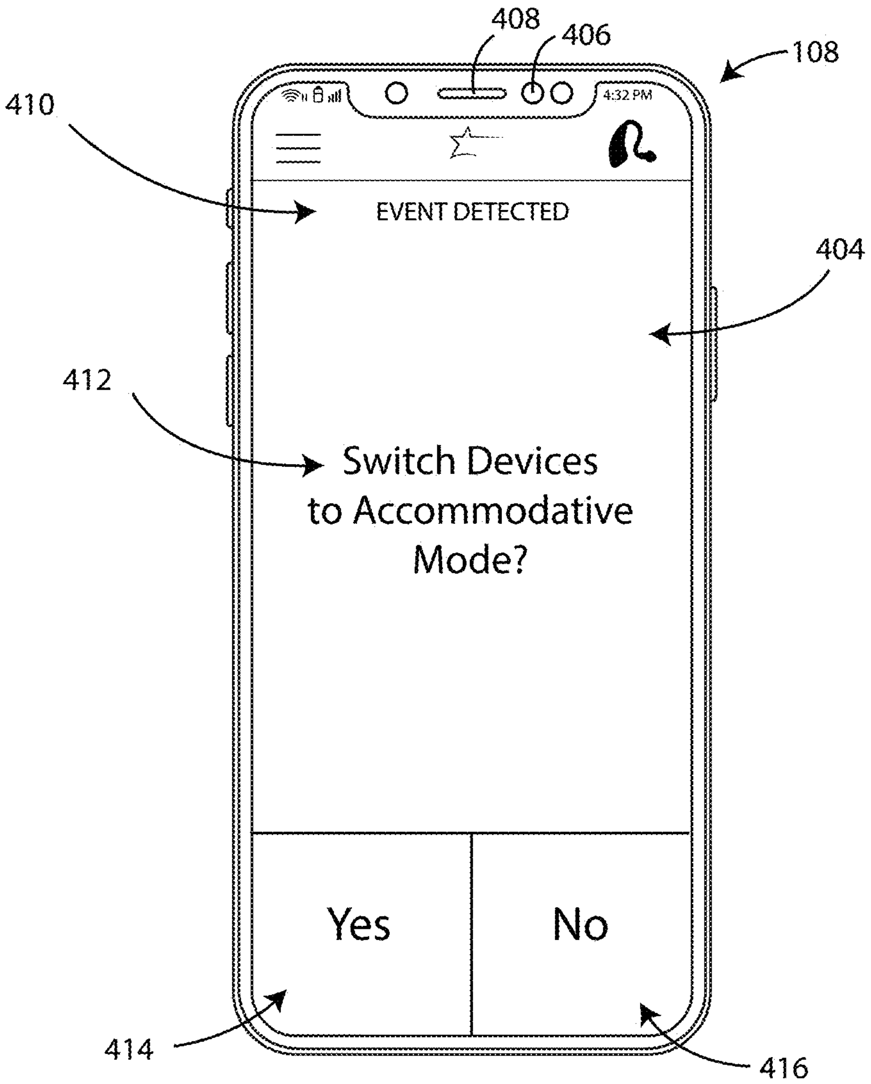
FIG. 4 is a schematic view of an accessory device in accordance with various embodiments herein.

Referring now to FIG. 4, a schematic view of an accessory device in the form of a personal communications device 108 is shown in accordance with various embodiments herein. The personal communications device 108 includes a speaker 408. The personal communications device 108 also includes a camera 406. The personal communications device 108 also includes a display screen 404. Various pieces of information (data, notifications, queries, warnings, instructions, etc.) can be displayed on the display screen 404.

The personal communications device 108 can include various user interface features on the display screen 404. By way of example, the personal communications device 108 can include a first user interface button 414. The personal communications device 108 can also include a second user interface button 416. In this example, the personal communications device 108 also includes a notification 410. The personal communications device 108 also includes a query 412. In this case, the subject can respond to the query 412 by interfacing with one of the buttons. In this case, the query 412 specifically if the subject would like the system to switch accommodative modes (e.g., from a hearing assistance device in active use mode to a hearing assistance device not being used mode, or vice versa, or the like).

While this example shows a visual notification/query, it will be appreciated that such notifications/queries etc. can be aural, visual, haptic, or a combination thereof.

Figure 5:
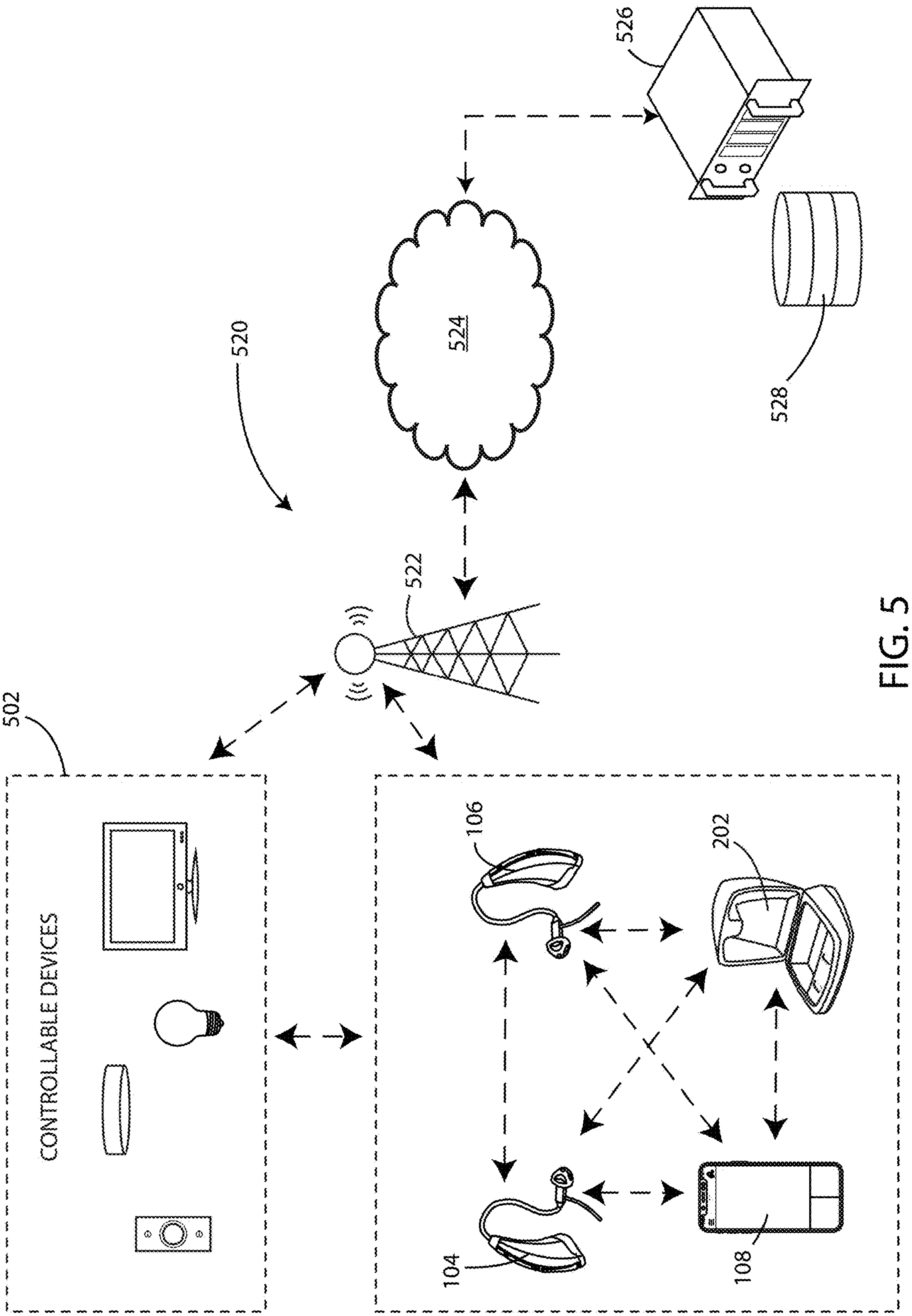
FIG. 5 is a schematic view of a data communication network in accordance with various embodiments herein.

Referring now to FIG. 5, a schematic view of a data communication network 520 is shown in accordance with various embodiments herein. This view shows a first hearing assistance device 104, a second hearing assistance device 106, a personal communications device 108, a charging case 202, which can all be a part of a hearing assistance system.

This view also shows controllable devices 502. Further details of exemplary controllable devices 502 are described elsewhere herein. The data communication network 520 can, in some cases, include a cell tower 522. However, in various embodiments, it will be appreciated that there are other ways for components of the hearing assistance system to connect to a data network (such as through a router or other pieces of networking equipment). The data communication network 520 includes the cloud 524. In this view, the data communication network 520 can also include a server 526 (real or virtual). In some embodiments, the server 526 may itself be considered to be a part of the cloud 524. In other embodiments, the server 526 may be reachable through the cloud 524. The data communication network 520 also includes a database 528. In some embodiments, the database 528 may itself be considered to be a part of the cloud 524. In other embodiments, the database 528 may be reachable through the cloud 524.

Figure 6:
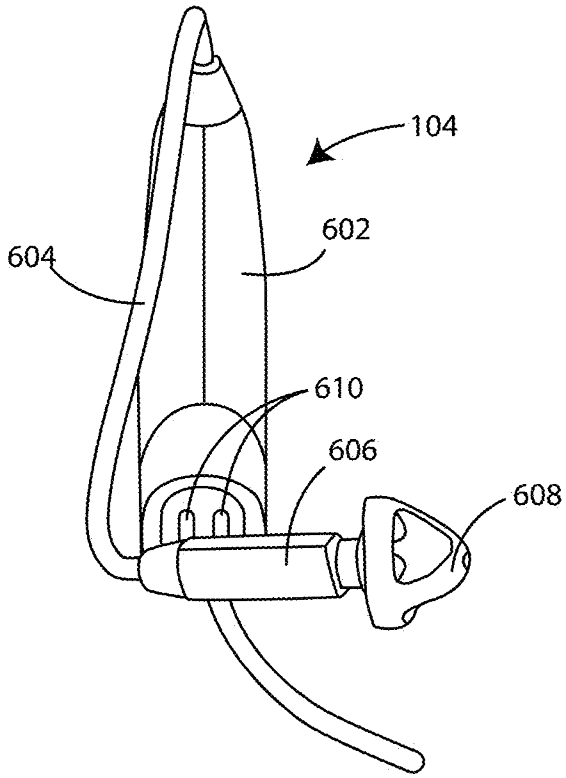
FIG. 6 is a schematic view of an ear-worn device in accordance with various embodiments herein.

Referring now to FIG. 6, a schematic view of a hearing assistance device 104 is shown in accordance with various embodiments herein. The hearing assistance device 104 can include a hearing assistance device housing 602. The device housing 602 can include electrical contacts 610 disposed thereon. The hearing assistance device 104 can also include a receiver 606 adjacent to an earbud 608. The receiver 606 can include a component that converts electrical impulses into sound, such as an electroacoustic transducer, speaker, or loud speaker. Such components can be used to generate an audible stimulus in various embodiments herein. A cable 604 or connecting wire can include one or more electrical conductors and provide electrical communication between components inside of the device housing 602 and components inside of the receiver 606.

The hearing assistance device 104 shown in FIG. 6 is a receiver-in-canal type device and thus the receiver is designed to be placed within the ear canal. However, it will be appreciated that may different form factors for ear-worn devices are contemplated herein. As such, ear-worn devices herein can include, but are not limited to, behind-the-ear (BTE), in-the ear (ITE), in-the-canal (ITC), invisible-in-canal (IIC), receiver-in-canal (RIC), receiver in-the-ear (RITE) and completely-in-the-canal (CIC) type hearing assistance devices.

Ear-worn devices of the present disclosure can incorporate an antenna arrangement coupled to a high-frequency radio, such as a 2.4 GHz radio. The radio can conform to an IEEE 802.11 (e.g., WIFI®) or BLUETOOTH® (e.g., BLE, BLUETOOTH® 4. 2 or 5.0) specification, for example. It is understood that ear-worn devices of the present disclosure can employ other radios, such as a 900 MHz radio. Ear-worn devices of the present disclosure can be configured to receive streaming audio (e.g., digital audio data or files) from an electronic or digital source. Representative electronic/digital sources (also referred to herein as accessory devices) include an assistive listening system, a TV streamer, a radio, a smartphone, a cell phone/entertainment device (CPED) or other electronic device that serves as a source of digital audio data or files.

Figure 7:
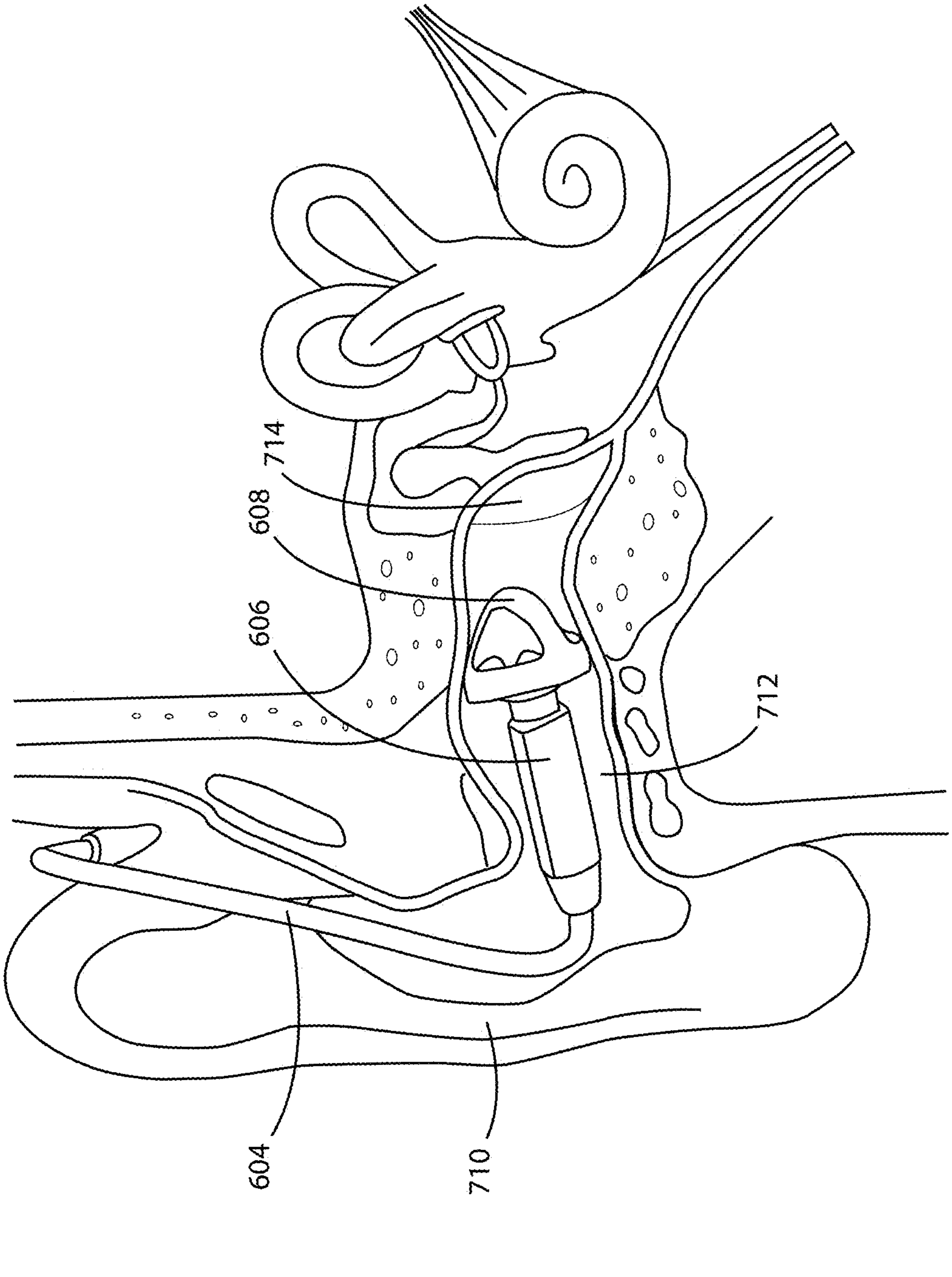
FIG. 7 is a schematic view of an ear-worn device within an ear in accordance with various embodiments herein.

As mentioned above, the hearing assistance device 104 shown in FIG. 6 can be a receiver-in-canal type device and thus the receiver is designed to be placed within the ear canal. Referring now to FIG. 7, a schematic view is shown of a hearing assistance device 104 disposed within the ear of a subject in accordance with various embodiments herein. In this view, the receiver 606 and the earbud 608 are both within the ear canal 712, but do not directly contact the tympanic membrane 714. The hearing device housing is mostly obscured in this view behind the pinna 710, but it can be seen that the cable 604 passes over the top of the pinna 710 and down to the entrance to the ear canal 712.

Figure 8:
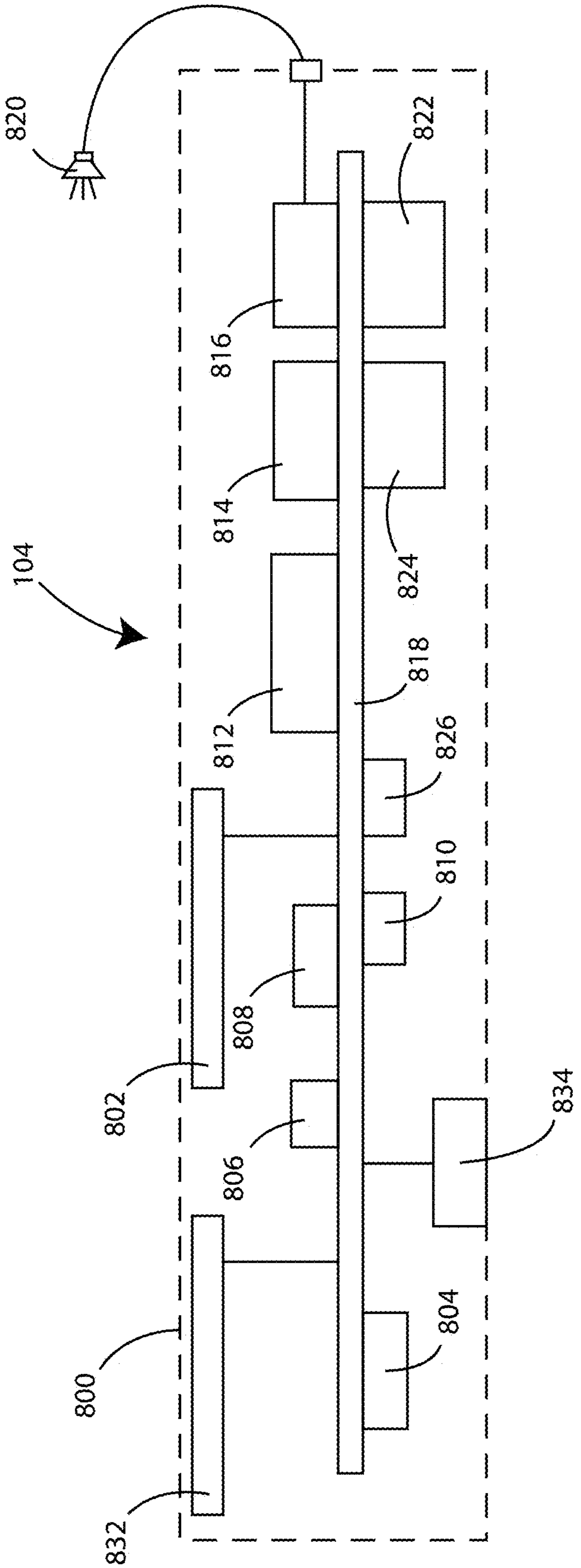
FIG. 8 is a block diagram of components of an ear-worn device in accordance with various embodiments herein.

Referring now to FIG. 8, a schematic block diagram of components of an ear-worn device is shown in accordance with various embodiments herein. The block diagram of FIG. 8 represents a generic ear-worn device for purposes of illustration. The hearing assistance device 104 shown in FIG. 8 includes several components electrically connected to a flexible mother circuit 818 (e.g., flexible mother board) which is disposed within housing 800. A power supply circuit 804 can include a battery and can be electrically connected to the flexible mother circuit 818 and provides power to the various components of the hearing assistance device 104. One or more microphones 806 are electrically connected to the flexible mother circuit 818, which provides electrical communication between the microphones 806 and a digital signal processor (DSP) 812. Among other components, the DSP 812 incorporates or is coupled to audio signal processing circuitry configured to implement various functions described herein. A sensor package 814 can be coupled to the DSP 812 via the flexible mother circuit 818. The sensor package 814 can include one or more different specific types of sensors such as those described in greater detail below. One or more user switches 810 (e.g., on/off, volume, mic directional settings) are electrically coupled to the DSP 812 via the flexible mother circuit 818.

An audio output device 816 is electrically connected to the DSP 812 via the flexible mother circuit 818. In some embodiments, the audio output device 816 comprises a speaker (coupled to an amplifier). In other embodiments, the audio output device 816 comprises an amplifier coupled to an external receiver 820 adapted for positioning within an ear of a wearer. The external receiver 820 can include an electroacoustic transducer, speaker, or loud speaker. The hearing assistance device 104 may incorporate a communication device 808 coupled to the flexible mother circuit 818 and to an antenna 802 directly or indirectly via the flexible mother circuit 818. The communication device 808 can be a BLUETOOTH® transceiver, such as a BLE (BLUETOOTH® low energy) transceiver or other transceiver(s) (e.g., an IEEE 802.11 compliant device). The communication device 808 can be configured to communicate with one or more external devices, such as those discussed previously, in accordance with various embodiments. In various embodiments, the communication device 808 can be configured to communicate with an external visual display device such as a personal communications device, a smart phone, a video display screen, a tablet, a computer, or the like.

In various embodiments, the hearing assistance device 104 can also include a control circuit 822 and a memory storage device 824. The control circuit 822 can be in electrical communication with other components of the device. In some embodiments, a clock circuit 826 can be in electrical communication with the control circuit. The control circuit 822 can execute various operations, such as those described herein. The control circuit 822 can include various components including, but not limited to, a microprocessor, a microcontroller, an FPGA (field-programmable gate array) processing device, an ASIC (application specific integrated circuit), or the like. The memory storage device 824 can include both volatile and non-volatile memory. The memory storage device 824 can include ROM, RAM, flash memory, EEPROM, SSD devices, NAND chips, and the like. The memory storage device 824 can be used to store data from sensors as described herein and/or processed data generated using data from sensors as described herein.

In various embodiments, the hearing assistance device 104 can also include electrical contacts 834 (such as to receive power to recharge a battery and/or capacitors). In various embodiments, the hearing assistance device 104 can also include a wireless power receiving antenna 832 (which can be used to receive power inductively or through another means to power the device and/or recharge a battery and/or capacitors).

It will be appreciated that various of the components described in FIG. 8 can be associated with separate devices and/or accessory devices to the ear-worn device. By way of example, microphones can be associated with separate devices and/or accessory devices. Similarly, audio output devices can be associated with separate devices and/or accessory devices to the ear-worn device.

Figure 9:
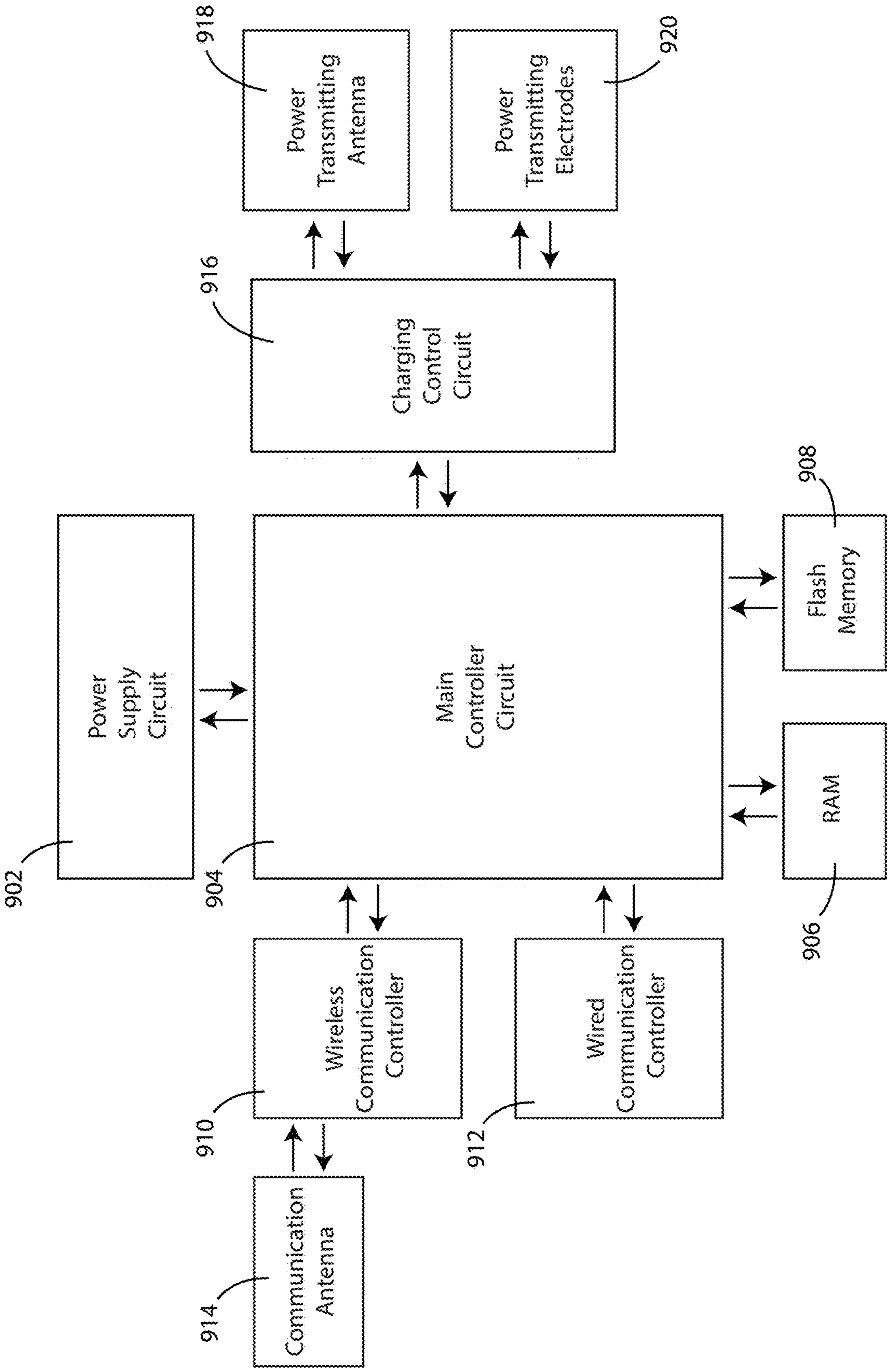
FIG. 9 is a block diagram of components of an accessory device in accordance with various embodiments herein.

Hearing device accessories herein can include, but are not limited to, a charger, a cell phone transmitter, a media streamer, a hearing aid remote, a USB dongle device, and a remote microphone. It will be appreciated that accessory devices herein can include various components. Referring now to FIG. 9, a block diagram is shown of some components of an accessory device in accordance with various embodiments herein. The hearing device accessory can include a main controller circuit 904. The main controller circuit 904 can include components such as a microprocessor, a microcontroller, an FPGA (field-programmable gate array) processing device, an ASIC (application specific integrated circuit), or the like. The main controller circuit 904 can also include components for internal wired communication (e.g., communication amongst components of the hearing device accessory) such as $I^2C$ (inter-integrated circuit bus) components and SPI (serial peripheral interface bus) components.

The hearing device accessory can also include a power supply circuit 902. In some cases, the hearing device accessory can be adapted to be powered by an AC current source, and thus the power supply circuit 902 can include a rectifier to convey DC current on to the main controller circuit and/or other components such as a transformer, voltage regulator, and the like. However, in some cases, the hearing device accessory can be adapted to be powered by a DC current source and/or a battery such as a primary or secondary battery and so the power supply circuit 902 may include a transformer and/or other components such as a voltage regulator and the like. The hearing device accessory can also include memory, such as RAM 906, and non-volatile memory such as flash memory 908. Memory of the hearing device accessory can include, but is not limited to, ROM, RAM, flash memory, EEPROM, SSD devices, NAND chips, and the like.

In various embodiments, the hearing device accessory can also include a wireless communication controller 910 that can control, facilitate, and/or enable wireless communication and can be in communication with an antenna 914. The wireless communication controller 910 can be configured to send and receive communications at various frequencies and using various wireless protocols including, but not limited to, WIFI®, BLUETOOTH®, ZIGBEE®, and the like. The wireless communication controller 910 can include hardware components such as a wireless receiver, wireless transmitter, wireless transceiver, and the like. In some embodiments, the communication controller 910 and the antenna 914 can be integrated.

In various embodiments, the hearing device accessory can also be in communication with a wired communication controller 912. The wired communication controller 912 be connected to jacks of various types to receive a wire or cable and can provide for communication over the wire or cable using serial or parallel approaches. In some embodiments, the wired communication controller can be configured to communicate using wired standards including, but not limited to, Ethernet, RS-232, RS-485, USB, and the like, and hardware components such as a UART, a USART, and the like.

In various embodiments, the hearing device accessory can also include a charging control circuit 916. In some embodiments, the charging control circuit 916 can be integrated into the main controller circuit 904. The charging control circuit 916 can control operations related to the provision of power for charging of hearing assistance devices herein. In some embodiments, the charging control circuit 916 can interface with and control a power transmitting antenna 918 (which can operate via inductive coupling, capacitive coupling, magnetodynamic coupling, microwave, etc.). In some embodiments, the charging control circuit 916 can interface with and control power transmitting electrodes 920 (such as if the hearing assistance devices are configured to be charged by direct contact with power transmitting electrodes).

It will be appreciated that hearing device accessories herein can also include various other components including, but not limited to, a speaker, a microphone, sensors, a battery, clock circuit, and the like.

Methods

Many different methods are contemplated herein, including, but not limited to, methods of making, methods of using, methods of operating a hearing assistance device, methods of controlling controllable devices, methods of adapting an environment to a hearing assistance device status, and the like. Aspects of system/device operation described elsewhere herein can be performed as operations of one or more methods in accordance with various embodiments herein.

In an embodiment, a method of operating a hearing assistance device is included, the method including detecting at least one condition, such as the hearing assistance device not being worn by the subject, the hearing assistance device in a not-in-use operating state, the hearing assistance device entering a recharging mode, and the hearing assistance device entering a shut-down sequence. The method can also include initiating sending a hearing accommodative command to a separate controllable device upon such detection. The hearing accommodative command can be sent from the hearing assistance device, an accessory device, a separate device, or a combination thereof.

In an embodiment of the method, the hearing accommodative command comprises at least one of a sound mode change and an alert mode change.

In an embodiment of the method, the sound mode change causes the volume setting on the controllable device to be increased or decreased. In an embodiment of the method, the sound mode change causes sound on the controllable device to be increased or decreased in frequency. In an embodiment of the method, the sound mode change causes the pattern of sound on the controllable device to be changed.

In an embodiment of the method, the alert mode change causes an alarm sensitivity of the separate controllable device to increase or decrease. In an embodiment of the method, the alert mode change causes a light associated with the separate controllable device to vary in at least one of color and intensity. In an embodiment of the method, the alert mode change causes a light associated with the separate controllable device to flash on and off.

In an embodiment of the method, the hearing assistance device event can be raised by detection of the hearing assistance device physically interfacing with an accessory device.

In an embodiment of the method, detecting the hearing assistance device not being worn by the subject is determined based on a crossing of a threshold physical proximity of the hearing assistance device to the accessory device. It will be appreciated that threshold physical proximities herein can vary. In some embodiments, the threshold physical proximity can be greater than or equal to 5 cm, 10 cm, 14 cm, 19 cm, 24 cm, 29 cm, 34 cm, 38 cm, 43 cm, 48 cm, 52 cm, 57 cm, 62 cm, 67 cm, 72 cm, 76 cm, 81 cm, 86 cm, 90 cm, 95 cm, or 100 cm. In some embodiments, the threshold physical proximity can be less than or equal to 2000 cm, 1905 cm, 1810 cm, 1715 cm, 1620 cm, 1525 cm, 1430 cm, 1335 cm, 1240 cm, 1145 cm, 1050 cm, 955 cm, 860 cm, 765 cm, 670 cm, 575 cm, 480 cm, 385 cm, 290 cm, 195 cm, or 100 cm. In some embodiments, the threshold physical proximity can fall within a range of 5 cm to 2000 cm, or 10 cm to 1905 cm, or 14 cm to 1810 cm, or 19 cm to 1715 cm, or 24 cm to 1620 cm, or 29 cm to 1525 cm, or 34 cm to 1430 cm, or 38 cm to 1335 cm, or 43 cm to 1240 cm, or 48 cm to 1145 cm, or 52 cm to 1050 cm, or 57 cm to 955 cm, or 62 cm to 860 cm, or 67 cm to 765 cm, or 72 cm to 670 cm, or 76 cm to 575 cm, or 81 cm to 480 cm, or 86 cm to 385 cm, or 90 cm to 290 cm, or 95 cm to 195 cm, or can be about 100 cm. Proximity can be detected in various ways. In some embodiments, signal attenuation techniques can be used to determine proximity. Sensor based techniques can also be used to determine proximity (such as with a magnetic field sensor or another electrical field sensor).

Controllable Devices

Various embodiments herein include controllable devices. Further details about the controllable devices are provided as follows. However, it will be appreciated that this is merely provided by way of example and that further variations are contemplated herein.

In various embodiments, controllable devices herein can include at least one of a TV, a radio, a doorbell, a smoke alarm, an oven, a microwave, a stove, a phone, a wireless speaker (e.g., Amazon ECHO device, Google Home device, Apple HomePod, or the like), a carbon monoxide detector, a refrigerator, and a security system.

In some embodiments, the controllable device can be any device including a controllable audio parameter. In some embodiments, the controllable device can be any device including a controllable visual parameter. In some embodiments, the controllable device is a Smart Home device. In some embodiments, the controllable device is a home automation device. In some embodiments, the controllable device is an assistive technology device.

Hearing Accommodative Commands

Various embodiments herein can include sending and/or receiving a hearing accommodative command. Further details about the hearing accommodative command are provided as follows. However, it will be appreciated that this is merely provided by way of example and that further variations are contemplated herein.

In various embodiments, the hearing accommodative command can include at least one of a sound mode change and an alert mode change. In various embodiments, the hearing accommodative command can be sent from a hearing assistance device, an accessory device, a separate device, or more than one of these.

In various embodiments, a sound mode change command can cause the volume setting on the controllable device to be increased or decreased. In various embodiments, a sound mode change command can cause sound on the controllable device to be increased or decreased in frequency. In various embodiments, a sound mode change command causes the pattern of sound on the controllable device to be changed In various embodiments, an alert mode change command causes an alarm sensitivity of the separate controllable device to increase or decrease. In various embodiments, an alert mode change causes a light associated with the separate controllable device to vary in at least one of color and intensity.

In various embodiments, an alert mode change command causes a light associated with the separate controllable device to flash on and off. In various embodiments, an alert mode change command causes an accessory device to monitor ambient sound for a trigger sound and initiate an alert signal when a trigger sound has been detected. In various embodiments, the trigger sound can include an audible alarm. In various embodiments, the alert signal can include a visual alert and/or a haptic alert.

In various embodiments, the hearing accommodative command is relayed to the separate controllable device through a personal communications device paired to the hearing assistance device. In various embodiments, the hearing accommodative command is sent wirelessly.

Hearing accommodative commands herein can be sent using various different formats and/or protocols. Hearing accommodative commands herein can be sent/received via wired or wireless protocols. Hearing accommodative commands can be sent/received via protocols including, but are not limited to, Ethernet, Infrared, UPB (Universal Powerline Bus), X10, Z-Wave, KNX, ZigBee, WI-FI, WeMo, Nest, Thread, BLUETOOTH, Insteon, C-Bus, and the like. Hearing accommodative commands can be sent/received via various automation platforms including, but not limited to, Amazon Alexa, Google Home/Assistant, Apple HomeKit, and the like. In various embodiments herein, hearing accommodative commands can include a sender ID, a recipient ID, a payload, and a timestamp. However, it will be appreciated that various other pieces of data can be a part of a hearing accommodative command sent herein. In some embodiments, no recipient ID is included or a code indicating that the command is generically directed to all devices that may receive it.

In some embodiments, hearing accommodative commands herein can be absolute, relative, or mode-based. For example, a command sent to a device to adjust the volume can be absolute ("set volume to level 10"), can be relative ("increase volume by 30%"), or can be mode-based ("set volume to level appropriate for use when hearing assistance devices are not in an active operational mode").

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

As used herein, the recitation of numerical ranges by endpoints shall include all numbers subsumed within that range (e.g., 2 to 8 includes 2.1, 2.8, 5.3, 7, etc.).

The headings used herein are provided for consistency with suggestions under 37 CFR 1.77 or otherwise to provide organizational cues. These headings shall not be viewed to limit or characterize the invention(s) set out in any claims that may issue from this disclosure. As an example, although the headings refer to a "Field," such claims should not be limited by the language chosen under this heading to describe the so-called technical field. Further, a description of a technology in the "Background" is not an admission that technology is prior art to any invention(s) in this disclosure. Neither is the "Summary" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed is:

1. A hearing assistance system comprising:
a hearing assistance device comprising
a control circuit;
a microphone in electrical communication with the control circuit;
an electroacoustic transducer for generating sound in electrical communication with the control circuit;
a power supply circuit in electrical communication with the control circuit;
wherein the hearing assistance system is configured to initiate sending a hearing accommodative command to a separate controllable device upon occurrence of a hearing assistance device event, the hearing accommodative command comprising a sound mode change, wherein the sound mode change causes sound on the controllable device to be increased or decreased in frequency;
wherein the hearing assistance device event is raised by detection of at least one of
the hearing assistance device not being worn by a subject;
the hearing assistance device in a not-in-use operating state;
the hearing assistance device entering a recharging mode; and
the hearing assistance device entering a shut-down sequence.

2. The hearing assistance system of claim 1, further comprising an accessory device configured to physically interface with the hearing assistance device when it is not being worn by a subject, wherein the hearing assistance device event can also be raised by detection of the hearing assistance device physically interfacing with the accessory device.

3. The hearing assistance system of claim 2, wherein detection of the hearing assistance device not being worn by the subject is determined based on a crossing of a threshold physical proximity of the hearing assistance device to the accessory device.

4. The hearing assistance system of claim 2, the accessory device comprising a charging case.

5. The hearing assistance system of claim 2, wherein the hearing accommodative command is sent from the accessory device.

6. The hearing assistance system of claim 1, the hearing assistance device further comprising a temperature sensor, wherein detection of the hearing assistance device not being worn by the subject is determined based on a change in temperature detected by the temperature sensor.

7. The hearing assistance system of claim 1, the separate controllable device selected from the group consisting of a TV, a radio, a doorbell, a smoke alarm, an oven, a stove, a phone, a wireless speaker, a carbon monoxide detector, a refrigerator, and a security system.

8. A hearing assistance system comprising:
a hearing assistance device comprising
a control circuit;
a microphone in electrical communication with the control circuit;
an electroacoustic transducer for generating sound in electrical communication with the control circuit;
a power supply circuit in electrical communication with the control circuit;
wherein the hearing assistance system is configured to initiate sending a hearing accommodative command to a separate controllable device upon occurrence of a hearing assistance device event, the hearing accommodative command comprising a sound mode change, wherein the sound mode change causes a pattern of sound on the controllable device to be changed;
wherein the hearing assistance device event is raised by detection of at least one of
the hearing assistance device not being worn by a subject;
the hearing assistance device in a not-in-use operating state;
the hearing assistance device entering a recharging mode; and
the hearing assistance device entering a shut-down sequence.

9. The hearing assistance system of claim 8, further comprising an accessory device configured to physically interface with the hearing assistance device when it is not being worn by a subject, wherein the hearing assistance device event can also be raised by detection of the hearing assistance device physically interfacing with the accessory device.

10. The hearing assistance system of claim 9, wherein detection of the hearing assistance device not being worn by the subject is determined based on a crossing of a threshold physical proximity of the hearing assistance device to the accessory device.

11. The hearing assistance system of claim 9, the accessory device comprising a charging case.

12. The hearing assistance system of claim 9, wherein the hearing accommodative command is sent from the accessory device.

13. The hearing assistance system of claim 8, the hearing assistance device further comprising a temperature sensor, wherein detection of the hearing assistance device not being worn by the subject is determined based on a change in temperature detected by the temperature sensor.

14. The hearing assistance system of claim 8, the separate controllable device selected from the group consisting of a TV, a radio, a doorbell, a smoke alarm, an oven, a stove, a phone, a wireless speaker, a carbon monoxide detector, a refrigerator, and a security system.

15. A hearing assistance system comprising:
a hearing assistance device comprising
a control circuit;
a microphone in electrical communication with the control circuit;
an electroacoustic transducer for generating sound in electrical communication with the control circuit;
a power supply circuit in electrical communication with the control circuit;

wherein the hearing assistance system is configured to initiate sending a hearing accommodative command to a separate controllable device upon occurrence of a hearing assistance device event, the hearing accommodative command comprising an alert mode change, wherein the alert mode change causes an accessory device to monitor ambient sound for a trigger sound and initiate an alert signal when a trigger sound has been detected;

wherein the hearing assistance device event is raised by detection of at least one of the hearing assistance device not being worn by a subject;

the hearing assistance device in a not-in-use operating state;

the hearing assistance device entering a recharging mode; and the hearing assistance device entering a shut-down sequence.

16. The hearing assistance system of claim 15, the trigger sound comprising an audible alarm.

17. The hearing assistance system of claim 15, wherein the alert mode change causes a light associated with the separate controllable device to vary in at least one of color and intensity.

18. The hearing assistance system of claim 15, wherein the alert mode change causes a light associated with the separate controllable device to flash on and off.

19. The hearing assistance system of claim 15, further comprising an accessory device configured to physically interface with the hearing assistance device when it is not being worn by a subject, wherein the hearing assistance device event can also be raised by detection of the hearing assistance device physically interfacing with the accessory device.

20. The hearing assistance system of claim 19, wherein detection of the hearing assistance device not being worn by the subject is determined based on a crossing of a threshold physical proximity of the hearing assistance device to the accessory device.

* * * * *